O. E. JENSON.
POURING SPOUT LID AND STRAINER.
APPLICATION FILED JUNE 28, 1918.

1,344,039.

Patented June 22, 1920.

Witness
Ernest O Crocker
J. L. Ratcliffe

Inventor
O. E. Jenson
By Chandler & Chandler
Attorneys

UNITED STATES PATENT OFFICE.

OLE E. JENSON, OF ROSEBEG, ALBERTA, CANADA.

POURING-SPOUT LID AND STRAINER.

1,344,039.  Specification of Letters Patent. Patented June 22, 1920.

Application filed June 28, 1918. Serial No. 242,404.

*To all whom it may concern:*

Be it known that I, OLE E. JENSON, a subject of the King of Great Britain, residing at Rosebeg, in the Province of Alberta, Dominion of Canada, have invented certain new and useful Improvements in Pouring-Spout Lids and Strainers; and I do hereby declare the following to be a full, clear, and exact description of the invention, such as will enable others skilled in the art to which it appertains to make and use the same.

The present invention relates to coffee pots and the like, and more particularly to attachments to the pot, to be carried thereby.

It is in general the object of the present invention to provide a simple and readily attachable straining device for coffee pots and the like, which serves at the same time to provide a cover or lid for the pouring spout of the receptacle whereby it is protected from settling of dust or access of other foreign matter thereto.

A further object resides in the provision of such a device which may be readily removed as desired to provide for a most thorough cleaning of the device and of the spout portion of the receptacle.

A still further object resides in the provision of a device of the present character adapted for use in connection with coffee pots or other receptacles wherein the pouring spout is bent directly from the wall of the receptacle, to thus procure an economy of structure over the present types of such receptacles wherein the pouring spout comprises a separate portion attached to the wall of the receptacle.

With the above and other objects and advantages in view, the invention resides more particularly in the novel combination, formation and arrangement of parts hereinafter described and particularly pointed out in the appended claims.

Figure 1:
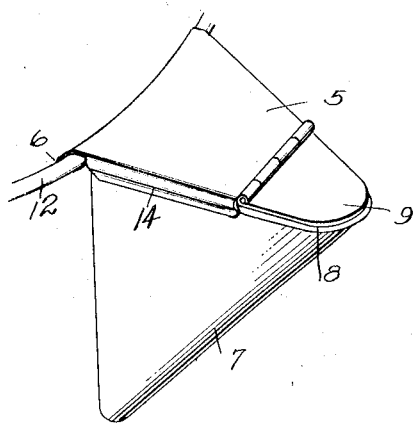
Figure 1 is a perspective view of the spout portion of a coffee pot having the improved strainer and cover device attached thereto.
Figure 2:
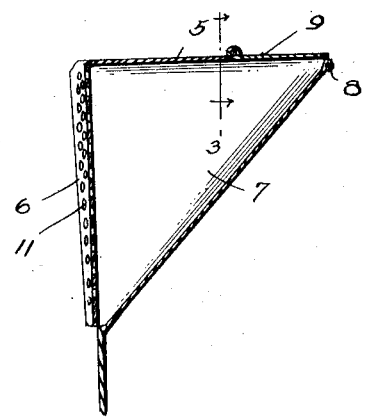
Fig. 2 is a vertical sectional view through the spout of the device on a plane radial with respect to the body of the receptacle.
Figure 3:
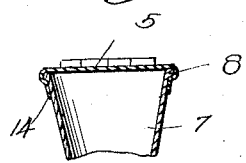
Fig. 3 is a transverse sectional view through the spout on the line 3—3 of Fig. 2.
Figure 4:
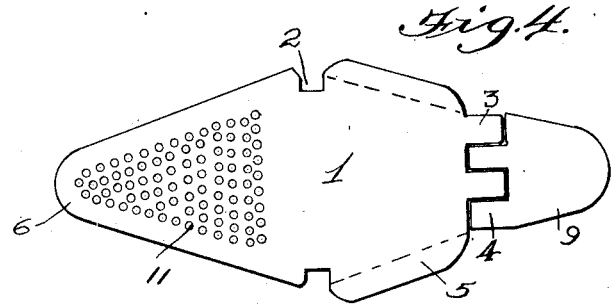
Fig. 4 is a plan view of the two blanks from which this device is formed.

Referring now more particularly to the drawings, the body of the device comprises a single plate 1 of metal, of substantially diamond shape with notches 2 in its side angles and one of its other angles removed except for a pair of tongues 3. This plate is bent transversely to provide a cover section 5 and a strainer section 6 disposed at substantially a right angle to the cover section and adapted to lie against the inner periphery of the wall of a coffee pot or other receptacle at its spout opening, with the cover section 5 extending over the spout. The latter is here designated at 7 and provided with the usual outturned bead 8 at its upper portion. To normally cover the outer portion of the spout and yet permit a free pouring of liquid therefrom, a plate 9 is hinged to the outer edge of the cover section 5 and adapted to seat on the rim of the spout and to swing away therefrom by gravity or by pouring of the liquid. This plate has originally two tongues 4 which, like those numbered 3, are rolled to form knuckles for receiving a hinge pin as will be understood. For detachably securing the device to the coffee pot, the plate 1 is bent on a cross line so that the notches 2 engage the beaded upper edge 12 of the pot 13, and the side edges of the cover section 5 of the body plate are bent downwardly and inwardly on the dotted lines to form flanges 14 which resiliently engage under the beads 8 of the spout, and thus hold the device firmly against accidental detachment. The strainer section 6 has perforations 11 formed therein, and thus is preferably intended to displace the usual strainer afforded by the perforate discharge portion of the wall of a conventional coffee pot or like receptacle, although it may be used in connection with such types of receptacles and provides therein in addition to a cover for the spout, also a readily detachable relatively fine straining means.

Preferably, however, to facilitate cleaning and to provide economy in structure, the present device is adapted for association with receptacles wherein the pouring spout is formed integrally with and bent outwardly from the wall of the receptacle, so that upon removal of the device, the spout comprises merely an open channel-way in which there is no possibility of lodgment of dirt.

What is claimed is:

1. The herein described attachment for the pouring spout of a coffee pot or the like, the same comprising a plate substantially of diamond shape with its forward angle truncated and its side angles notched, bent on a line intersecting said notches so that its forward section overlies the spout of the pot and its remaining section overlies the inlet of said spout with its notches engaging the rim of the pot, said inner section being perforated, the side edges of said forward section having depending flanges for engaging the bead around the top of the spout.

2. The herein described attachment for the pouring spout of a coffee pot or the like, the same comprising a plate substantially of diamond shape with its forward angle truncated and its side angles notched, bent on a line intersecting said notches so that its forward section overlies the spout of the pot and its remaining section overlies the inlet of said spout with its notches engaging the rim of the pot, said inner section being perforated and said truncated end having tongues bent into hinge-knuckles, and a second plate adapted to cover the remainder of the spout and having hinge-knuckles coacting with those mentioned for the reception of a pivot pin.

3. The herein described attachment for the pouring spout of a coffee pot or the like, the same comprising a plate adapted to cover the inner portion of said spout, having downturned side flanges adapted to embrace the bead of the spout, notched in rear of the flanges to engage the bead of the pot, and bent down inside the pot in rear of said notches, a second plate adapted to overlie the remainder of the spout, and a hinge between the meeting edges of said plates.

In testimony whereof, I affix my signature, in the presence of two witnesses.

OLE E. JENSON.

Witnesses:
H. O. KNOWLES,
G. M. AIKINS.